Feb. 25, 1947.    H. MORRISON    2,416,341
PURE SINUSOIDAL WAVE GENERATOR
Filed June 25, 1943

INVENTOR
H. MORRISON
BY
H. O. Wright
ATTORNEY

Patented Feb. 25, 1947

2,416,341

UNITED STATES PATENT OFFICE 2,416,341

PURE SINUSOIDAL WAVE GENERATOR

Howard Morrison, Morristown, N. J., assignor to Bell Telephone Laboratories, Incorporated, New York, N. Y., a corporation of New York Application June 25, 1943, Serial No. 492,263

3 Claims. (Cl. 171—209)

This invention relates to an improved electromagnetic generator for generating alternating currents of substantially pure sinusoidal wave form.

For radio object locating systems employing wave reflection it is frequently desired to deflect the ray of a cathode ray oscilloscope circularly in synchronism with the circular rotation of an exploratory sharply directive radio energy beam.

A convenient method of accomplishing this is to drive a small sine wave generator, preferably a two-phase generator producing two voltages displaced 90 degrees in phase with respect to each other, by the same means which effects the rotation of the antenna beam and to apply the voltages to the deflecting plates of an oscilloscope, one wave being applied to one pair of deflecting plates and the other wave being applied to the second pair of deflecting plates. Alternatively, as is well known in the art, a single sine wave may be generated and split by a phasing network to produce two sine wave voltages in quadrature relation for use on the deflecting plates of the oscilloscope.

It has been found, however, that the conventional forms of sine wave generators do not produce substantially pure sine wave voltages, particularly, if as for the present purposes it is desirable at times to vary the rotational speed substantially.

It is, therefore, the principal object of this invention to provide generators which will produce substantially pure sine wave voltages for a wide range of rotational speeds.

Since phase splitting networks may also vary undesirably with frequency, or rotational speed of the generating source, it is also an object of the invention to provide two substantially pure sine wave voltages having a phase displacement of 90 degrees with respect to each other.

It has been found that the above objects can be realized by the use of a small generator having a stator with a square central opening the stator having windings thereon in which the desired voltages are generated and a bipolar rotor, centrally located within the square central opening of the stator and having a substantial clearance therewith.

A preferred form of generator, illustrative of the application of the principles of the invention is described in detail hereinunder in connection with the appended drawings in which.

Figure 1:
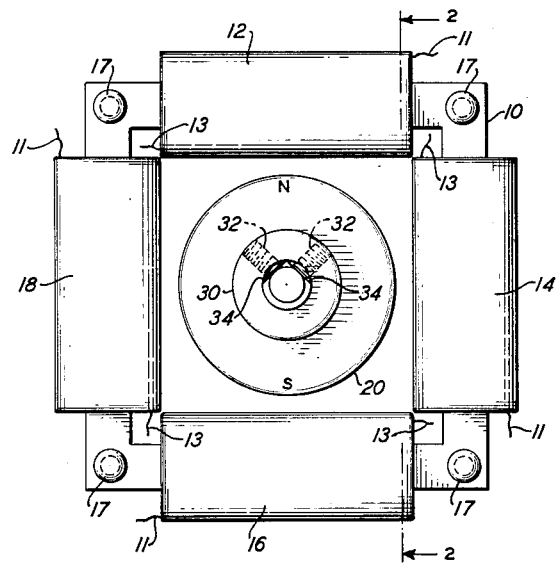
Fig. 1 is a plan view of a generator of the invention.
Figure 2:
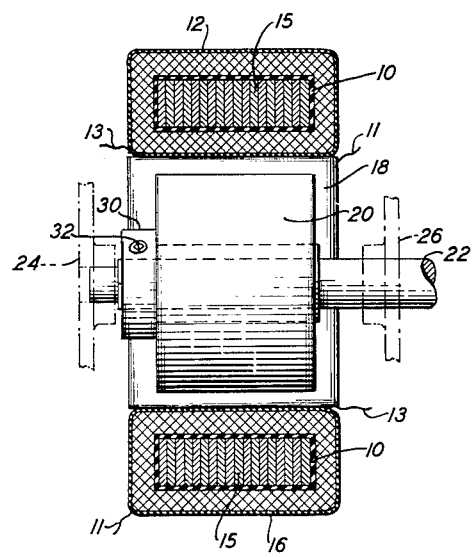
Fig. 2 is a partially cross-sectioned side view of the generator of Fig. 1.

In more detail, in Figs. 1 and 2 the stator 10 is, as shown, square in form. Windings 12, 14, 16, and 18 are uniformly distributed on the four legs of the stator, respectively. As shown in the partial cross-sectioned view of Fig. 2, stator 10 is built up of laminations 15 held together at the four corners by rivets 17, Fig. 1, and is preferably of low reluctance magnetic material such as silicon steel.

The rotor 20 is cylindrical in shape to provide symmetry and smooth rotation and is preferably of a magnetic material having a high coercive force. One class of such materials is described in U. S. Patents 2,027,994 to 2,027,999, inclusive, all issued January 14, 1936, to T. Mishima. The rotor is permanently magnetized as a bipolar magnet, the north and south poles thereof being diametrically opposite each other as indicated in Fig. 1. It is supported centrally within the square opening of the stator on shaft 22 which in turn may rotate in bearings 23, 26.

To fasten the rotor 20 rigidly to the shaft 22, the rotor is provided at one end with a collar 30 through which threaded set screws 32 may be tightened to seat on flattened portions 34 at the end of shaft 22.

The larger the air-gap between the rotor and the nearest points of the stator, the more nearly pure will the sine wave voltages generated in the windings of the stator be. If the diameter of the rotor is in the order of three-fourths of the side of the square opening in the stator, the voltage waves generated will be of substantially pure sinusoidal form.

To provide two voltages displaced 90 degrees in phase with respect to each other the windings 12 and 16 are connected so that the voltages generated therein add effectively in series to provide one voltage and the windings 14 and 18 are likewise connected to provide the second voltage. Of course, either pair of windings or any single winding can be employed alone to provide a single pure sine wave voltage.

An analysis of the flux distribution and variation with rotation of the rotor makes it apparent that if all the coils 12, 14, 16 and 18 are wound in the same direction around their respective stator legs and lead 11 represents the outer end of the winding and lead 13 the inner end, in each instance, to connect opposite coils so that their voltages add, either the inner winding ends, or the outer winding ends should be connected together and the free ends employed as the terminal leads for the pair of windings.

A number of modifications of the arrangement of Figs. 1 and 2 will readily occur to those skilled in the art within the spirit and scope of the principles of the invention. For example, the rotor can be an electromagnet or a simple bipolar bar magnet, shielding can be provided, if desired, to eliminate stray fields, and the like. The scope of the invention is defined in the following claims.

What is claimed is:

1. An electromagnetic two-phase generator comprising a stator of low reluctance magnetic material, having a square opening therein, two windings, comprising two portions each, the two portions of each winding being disposed substantially uniformly on said stator on opposite sides of the stator, a cylindrical rotor of magnetic material of high coercive force, said rotor being permanently magnetized to have one magnetic north pole and one magnetic south pole, said poles being at diametrically opposite points on said rotor, the diameter of the rotor being not greater than three-fourths of the side dimension of the square opening in said stator, the rotor being mounted for rotation centrally within the opening in said stator, the opening in said stator being free from magnetic material except for said rotor, whereby substantially pure sine wave form voltages will be generated in said windings by rotation of said rotor at any speed within a wide range of rotational speeds.

2. A purely sinusoidal voltage wave generator comprising a stator of magnetic material having a square opening therein, a winding disposed on a leg of said stator, and a bipolar magnet centrally positioned within the opening of the stator and adapted for rotation about the normal axis through the center of the opening, the opening being free from magnetic material except for said bipolar magnet, the maximum dimension of said magnet, transversely to the normal axis through the center of the opening, being not greater than three-fourths of the side dimension of said square opening.

3. In an object locating system, means for accurately reproducing at a distance the rotation of an exploratory member which includes an electromagnetic generator comprising a rotor consisting of a bipolar magnet cooperatively coupled with the rotating member to rotate therewith, a stator having an opening of square cross-sectional area therethrough, the rotor being centrally positioned within said opening, said stator including at least two windings having their longitudinal axes placed at 90 degrees with respect to each other, the distance between the polar extremities of said bipolar magnet being not greater than three-fourths of a side of the square opening in the stator the opening in said stator being free from magnetic material except for said rotor whereby substantially pure sinusoidal voltages will be generated in the stator windings and the two generated voltages at 90 degrees may be employed to produce a rotating field which will accurately follow the rotation of said exploratory member.

HOWARD MORRISON.

REFERENCES CITED

The following references are of record in the file of this patent:

UNITED STATES PATENTS

| Number | Name | Date |
|---|---|---|
| 2,130,912 | Tolson | Sept. 20, 1938 |
| 2,263,377 | Busignies et al. | Nov. 18, 1941 |
| 224,642 | Burgin | Feb. 17, 1880 |
| 2,270,877 | Herzog | Jan. 27, 1942 |
| 2,142,094 | Dorn | Jan. 3, 1939 |